(12) United States Patent
Sano et al.

(10) Patent No.: US 6,486,567 B2
(45) Date of Patent: Nov. 26, 2002

(54) MULTI-OUTPUT DC-DC CONVERTER AND ELECTRONIC APPARATUS USING THE SAME

(75) Inventors: Naoto Sano, Otsu; Shingo Kunii, Kadoma, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/985,723

(22) Filed: Oct. 15, 2001

(65) Prior Publication Data

US 2002/0074977 A1 Jun. 20, 2002

(30) Foreign Application Priority Data

Nov. 2, 2000 (JP) ........................................ 2000-336317

(51) Int. Cl.[7] .................................................. H02J 1/00
(52) U.S. Cl. ....................................................... 307/32
(58) Field of Search ............................... 307/31, 32, 33, 307/11

(56) References Cited

U.S. PATENT DOCUMENTS 6,239,509 B1 * 5/2001 Rader et al. ................... 307/11

* cited by examiner

Primary Examiner—Shawn Riley
(74) Attorney, Agent, or Firm—Ostrolenk, Faber, Gerb & Soffen, LLP

(57) ABSTRACT

A multi-output DC-DC converter includes a step-down DC-DC converter circuit which includes a switching device for switching an input DC voltage to convert it to a pulse voltage, a choke coil and a smoothing capacitor for smoothing the pulse voltage to obtain a first output lower than the input DC voltage, and a flywheel rectifying device for causing a current to flow through the choke coil when the switching device is off; and a rectifying circuit for processing and rectifying the pulse voltage in the DC-DC converter circuit to obtain a second output. Since the flywheel rectifying device is a bi-directional synchronous rectifying device which is turned on when the switching device is off, even when the load current of the first output decreases, the amplitude of the source voltage of the switching device is not reduced. Therefore, the second output obtained from the rectifying circuit always maintains a normal value.

14 Claims, 5 Drawing Sheets

FIG. 6(a) PRIOR ART VOLTAGE
FIG. 6(b) PRIOR ART CURRENT
FIG. 6(c) PRIOR ART VOLTAGE
FIG. 6(d) PRIOR ART CURRENT
FIG. 6(e) PRIOR ART VOLTAGE
FIG. 6(f) PRIOR ART CURRENT
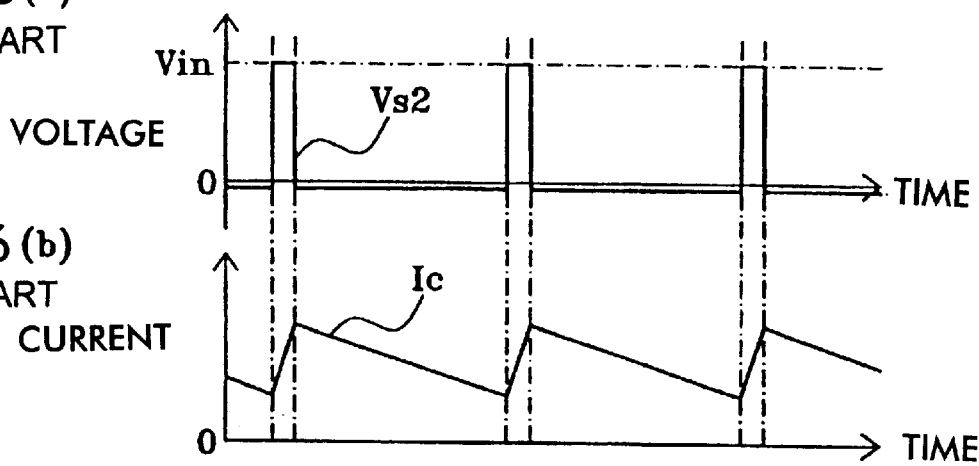
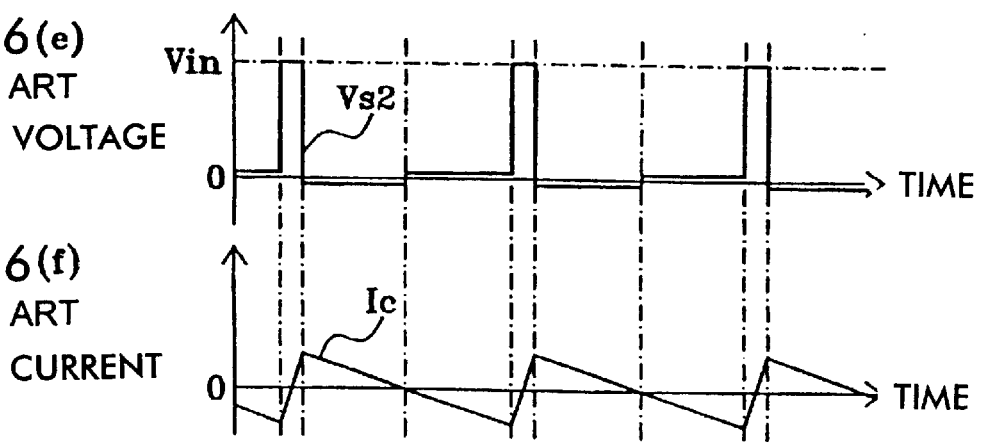

MULTI-OUTPUT DC-DC CONVERTER AND ELECTRONIC APPARATUS USING THE SAME

BACKGROUND OF THE INVENTION

1. Field of the Invention

The present invention relates to multi-output DC-DC converters and electronic apparatus using a multi-output DC-DC converter.

2. Description of the Related Art

FIG. 5 is a circuit diagram of a conventional multi-output DC-DC converter. In FIG. 5, a multi-output DC-DC converter 1 comprises a DC-DC converter circuit 2, and rectifying circuits 3 and 4.

The DC-DC converter circuit 2 comprises a DC power supply V1 having an output voltage Vin; a capacitor C1 connected in parallel to the DC power supply V1; a choke coil L1 and an FET Q1 serving as a switching device, connected in series between the DC power supply V1 and an output terminal P1; a diode D1 serving as a flywheel rectifying device connected between the ground and the connection point of the FET Q1 and the choke coil L1; and a capacitor C2 serving as a smoothing capacitor connected between the output terminal P1 and the ground. The gate of the FET Q1 is connected to a control circuit (not shown) and the FET Q1 is on-off-controlled by a switching signal input from the control circuit. The control circuit detects a voltage Vout at the output terminal P1 and feeds it back to set the switching frequency and the pulse width of the FET Q1, so that the voltage Vout at the output terminal P1 is stabilized. The output at the output terminal P1 serves as a first output.

The connection point of the FET Q1 and the choke coil L1 in the DC-DC converter circuit 2 is connected to the rectifying circuits 3 and 4. The rectifying circuit 3 is a double-voltage rectifying circuit comprising of two diodes and two coupling capacitors, and the output thereof is connected to an output terminal P2. The rectifying circuit 4 is a quadruple rectifying circuit formed of four diodes and four coupling capacitors, and the output thereof is connected to an output terminal P3. Two outputs that are twice and four times as high as the first output P1 are obtained from the output terminals P2 and P3.

FIG. 6 shows the waveforms of the source voltage Vs (voltage obtained at the connection point of the FET Q1 and the choke coil L1) of the FET Q1, serving as a switching device, and a current Ic flowing through the choke coil L1 when the load current of the first output varies. FIG. 6(a) and FIG. 6(b) show the source voltage Vs and the current Ic obtained when the load current is sufficiently high (at a heavy load or at a normal load), FIG. 6(c) and FIG. 6(d) show the source voltage Vs and the current Ic obtained when the load current is lower (at a normal load), and FIG. 6(e) and FIG. 6(f) show the source voltage Vs and the current Ic obtained when the load current is very low (at a light load or at no load).

As shown in FIG. 6(a) and FIG. 6(b), when the load current of the first output is high, the source voltage Vs becomes equal to the voltage Vin of the DC power supply V1 when the FET Q1 is on and the current Ic increases. When the FET Q1 goes off, the current Ic flows from ground to the choke coil L1 through the diode D1 by the excited energy of the choke coil L1. The current Ic decreases as the excited energy of the choke coil L1 is reduced. Since the excited energy is large, the current Ic does not reach zero until the FET Q1 is turned on next time. During this period, the source voltage Vs of the FET Q1 is lower than the ground voltage by the voltage drop caused by the diode D1.

As shown in FIG. 6(c) and FIG. 6(d), when the load current of the first output becomes lower, since the excited energy of the choke coil L1 becomes smaller, the current Ic is zero for a period between when the FET Q1 is turned off and when the FET Q1 is turned on next time. In other words, the period when the diode D1 is on is reduced. When the current Ic flowing through the choke coil L1 becomes zero, the source voltage Vs of the FET Q1 is equal to the output voltage Vout of the first output.

As shown in FIG. 6(e) and FIG. 6(f), when the load current of the first output is further smaller or becomes zero, the ON time of the diode D1 is further reduced and the source voltage Vs of the FET Q1 does not lower to the ground voltage or less and is above the ground voltage.

The rectifying circuits 3 and 4 of the DC-DC converter 1 shown in FIG. 5 output voltages corresponding to the amplitudes of an input voltage because they have coupling-capacitor-input structures.

When the load current of the first output becomes very low as shown in FIG. 6(e), the difference between the maximum value and the minimum value of the amplitude of a voltage input to the rectifying circuits 3 and 4, namely, the source voltage Vs of the FET Q1 becomes small. Therefore, the rectifying circuits 3 and 4 do not operate as intended, and the voltages of the second outputs obtained at the output terminals P2 and P3 are reduced.

The lower the load current of the first output becomes, the shorter the ON time of the diode D1 is and the longer the time is during which the source voltage Vs is equal to the output voltage Vout of the first output, and therefore, the time during which the source voltage Vs shows the minimum value becomes relatively shorter within one switching period. When the time during which the source voltage Vs shows the minimum value is reduced even if the time during which the source voltage Vs shows the maximum value does not change, the rectifying circuits 3 and 4 cannot be made to operate efficiently. Also in terms of this point, it is difficult to take out electric power from the second outputs.

SUMMARY OF THE INVENTION

The present invention has been made in consideration of the above conditions. It is an object of the present invention to provide a multi-output DC-DC converter which, when a second output is obtained by using the pulse voltage of the DC-DC converter circuit used for obtaining a first output, prevents a reduction in the output voltage of the second output even when the load current of the first output becomes very low, and an electronic apparatus using the multi-output DC-DC converter.

The foregoing and other objects are achieved according to the present invention through the provision of a multi-output DC-DC converter including a step-down DC-DC converter circuit which includes a switching device for switching an input DC voltage to convert it to a pulse voltage, a choke coil and a smoothing capacitor for smoothing the pulse voltage to obtain a first output lower than the input DC voltage, and a flywheel rectifying device for causing a current to flow through the choke coil when the switching device is off; and a rectifying circuit for processing and rectifying the pulse voltage of the DC-DC converter circuit to obtain a second output, wherein the rectifying device is a bi-directional synchronous rectifying device which is turned on when the switching device is off.

In the multi-output DC-DC converter, the choke coil may be a transformer of which the secondary winding is connected to the rectifying circuit.

In the multi-output DC-DC converter, the rectifying circuit may comprise a coupling capacitor and a diode.

An electronic apparatus according to the present invention has one of the multi-output DC-DC converters described above.

Since one of the above structures is used, a multi-output DC-DC converter according to the present invention prevents a reduction in the output voltage of the second output even if the load current of the first output becomes very low.

BRIEF DESCRIPTION OF THE DRAWING(S)

Figure 5:
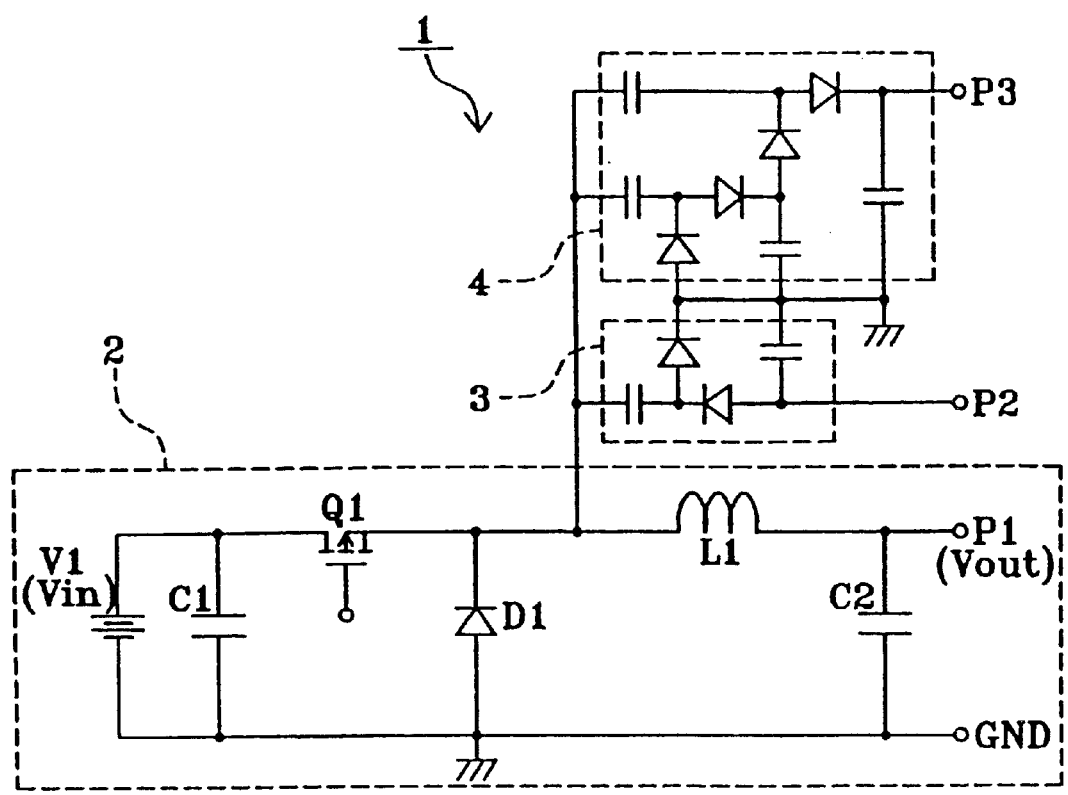
FIG. 5 is a circuit diagram of a conventional DC-DC converter.

FIGS. 6(a)–6(f) are views showing the characteristics of the conventional multi-output DC-DC converter shown in FIG. 5, obtained as time elapses.

DETAILED DESCRIPTION OF EMBODIMENTS OF THE INVENTION

Figure 1:
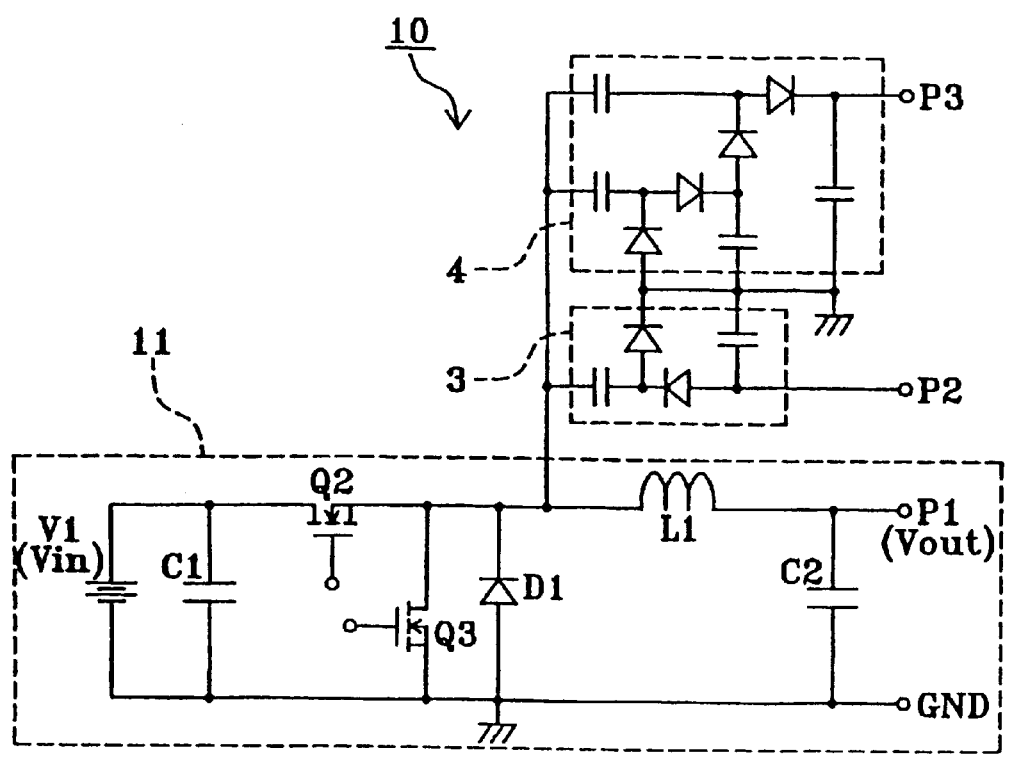
FIG. 1 is a circuit diagram of a multi-output DC-DC converter according to an embodiment of the present invention.

FIG. 1 is a circuit diagram of a multi-output DC-DC converter according to an embodiment of the present invention. In FIG. 1, the same symbols as those used in FIG. 5 are assigned to the same portions as or similar portions to those shown in FIG. 5, and a description thereof is omitted.

As shown in FIG. 1, in a DC-DC converter 10, a DC-DC converter circuit 11 is provided with a switching device Q2 instead of the switching device Q1 used in the DC-DC converter shown in FIG. 5, and in addition, is provided with an FET Q3 serving as a bidirectional synchronous rectifying device connected in parallel to the diode D1. The FET Q2 and the FET Q3 are preferably MOS FETs.

The gate of the FET Q2 is connected to a control circuit (not shown) and the FET Q2 is on-off-controlled by a switching signal input from the control circuit. The control circuit detects a voltage at an output terminal P1 to feed it back to set the switching frequency and the pulse width of the FET Q2, so that the voltage Vout at the output terminal P1 is stabilized.

The gate of the FET Q3 is connected to the control circuit (not shown) in the same way as for the FET Q2, and the FET Q3 is on-off-controlled by a signal input from the control circuit such that the FET Q3 is turned on while the FET Q2 is off. The FET Q2 and the FET Q3 are controlled in some cases such that they are alternately turned on with both-FET-OFF periods being sandwiched in order to avoid a state in which they are on at the same time even for a moment to make the DC power supply V1 short-circuited.

Figure 2:
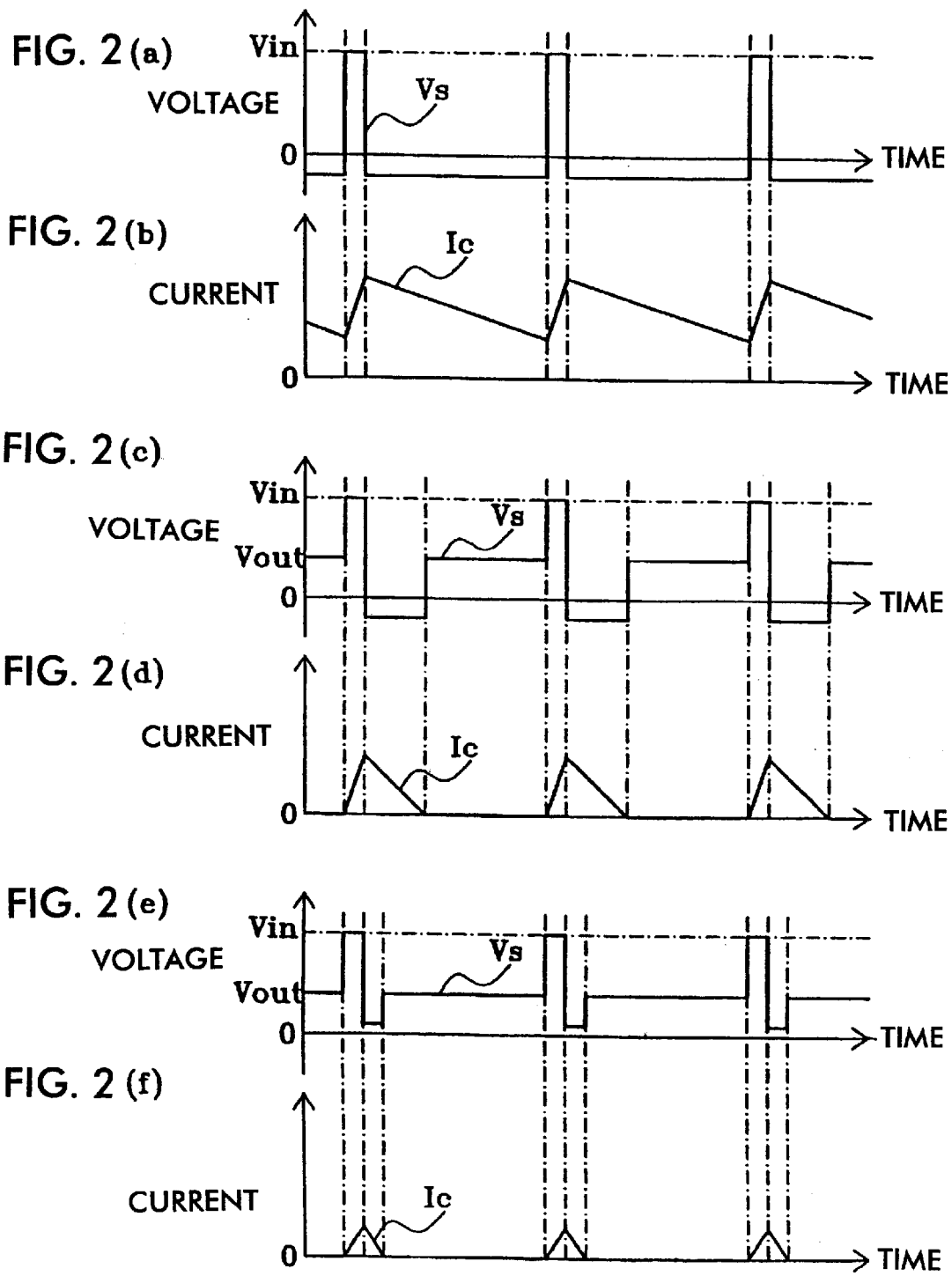
FIG. 2 is a view showing the characteristics of the multi-output DC-DC converter shown in FIG. 1, obtained as time elapses.

FIG. 2 shows the waveforms of the source voltage Vs2 (voltage obtained at the connection point of the FET Q2 and choke coil L1) of the FET Q2, serving as a switching device, and a current Ic flowing through the choke coil L1 when the load current of the first output varies. FIG. 2(a) and FIG. 2(b) show the source voltage Vs2 and the current Ic obtained when the load current is sufficiently high (at a heavy load or at a normal load), FIG. 2(c) and FIG. 2(d) show the source voltage Vs2 and the current Ic obtained when the load current is lower (at a normal load), and FIG. 2(e) and FIG. 2(f) show the source voltage Vs2 and the current Ic obtained when the load current is very low (at a light load or at no load).

As shown in FIG. 2(a) and FIG. 2(b), when the load current of the first output is high, the waveforms are substantially the same as in the conventional multi-output DC-DC converter 1. The current which flows trough the diode D1 in the conventional DC-DC converter 1 mainly flows through the FET Q3, which has a lower resistance than the diode DI. The source voltage Vs2 of the FET Q2 is slightly lower than the ground voltage by the voltage drop at the FET Q3, which is smaller than that caused by the diode D1. The current may flow through the diode D1 for a short period in which the FET Q2 is off and the FET Q3 is also off.

As shown in FIG. 2(c) and FIG. 2(d), when the load current of the first output becomes low, since the excited energy of the choke coil L1 becomes small, the current Ic is zero for a period between when the FET Q2 is turned off and when the FET Q2 is turned on next time. Even in this period, since the FET Q3 is on and is bi-directional, the current Ic flows in the reverse direction through the FET Q3 and the inductor device L1 until the FET Q3 becomes off the next time. Therefore, the source voltage Vs2 of the FET Q2 is almost 0 V (actually, slightly higher than the ground voltage by the voltage drop caused by the FET Q3) when the current Ic flows in the reverse direction. Unlike the conventional multi-output DC-DC converter 1, the source voltage is not equal to the output voltage Vout of the first output.

As shown in FIG. 2(e) and FIG. 2(f), when the load current of the first output is further smaller or becomes zero, since the current Ic can flow in both directions through the FET Q3 while the FET Q2 is off, the source voltage Vs2 of the FET Q2 is almost 0 V.

As described above, in the DC-DC converter circuit 11, since the FET Q3 is on while the load current of the first output becomes very small or zero, the source voltage Vs2 of the FET Q2 rises when the FET Q2 is off, and the difference between the maximum value and the minimum value of the source voltage Vs2 of the FET Q2 does not become small. Therefore, the amplitude of the voltage input to the rectifying circuits 3 and 4 does not become small. The second output voltages obtained at output terminals P2 and P3 are maintained at normal values, and a reduction in the output voltages is prevented.

Since the source voltage Vs2 does not become equal to the output voltage Vout of the first output, the source voltage Vs2 shows the maximum value for a constant period and also shows the minimum value for a constant period. Therefore, the rectifying circuits 3 and 4 are made to operate in a stable condition, and it is easy to obtain electric power from the second outputs.

Figure 3:
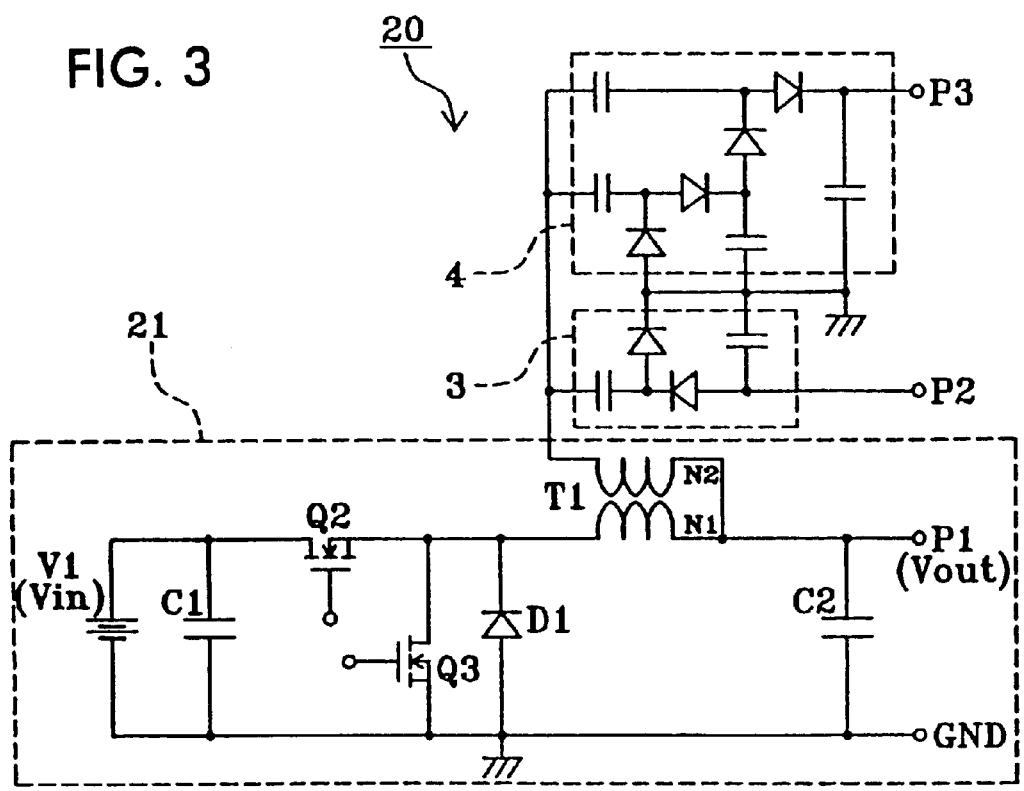
FIG. 3 is a circuit diagram of a multi-output DC-DC converter according to another embodiment of the present invention.

FIG. 3 shows a multi-output DC-DC converter according to another embodiment of the present invention. In FIG. 3, the same symbols as those used in FIG. 1 are assigned to the same portions as or similar portions to those shown in FIG. 1, and a description thereof is omitted.

As shown in FIG. 3, in a DC-DC converter 20, a DC-DC converter circuit 21 is provided with a transformer T1 instead of the inductor device L1 of the DC-DC converter 10 shown in FIG. 1. The primary winding N1 of the transformer T1 is connected in series between the source of an FET Q2 and an output terminal P1, and the secondary winding N2 is connected to the output terminal P1 at one end and is connected to rectifying circuits 3 and 4 at the other end.

Since a pulse voltage may be applied to the rectifying circuits 3 and 4 through the transformer T1 instead of the inductor device L1, the same advantages as when the inductor device L1 is used are obtained.

In the DC-DC converter circuits 11 and 21 of the multi-output DC-DC converters 10 and 20 of the present invention, the diode D1 is connected in parallel to the FET Q3, serving as a synchronous rectifying device. This is to cause a current to flow through the inductor device L1 while both FET Q2 and FET Q3 are off. Therefore, if both FET Q2 and FET Q3 are off for a very limited period, the diode D1 does not need to be used. When a MOS FET is used for the FET Q3, since the diode component of the MOS FET can be used instead of the diode D1, the diode D1 does not need to be provided even when both FET Q2 and FET Q3 are off for a certain period.

In the multi-output DC-DC converters 10 and 20, the two second outputs are obtained from the two rectifying circuits 3 and 4. A multi-output DC-DC converter needs to have a structure in which a second output is obtained by using the pulse voltage of a DC-DC converter circuit used for obtaining a first output, but the number of second outputs can be one, two or three or more, and the same advantages as in cases where the two second outputs are obtained are provided.

Figure 4:
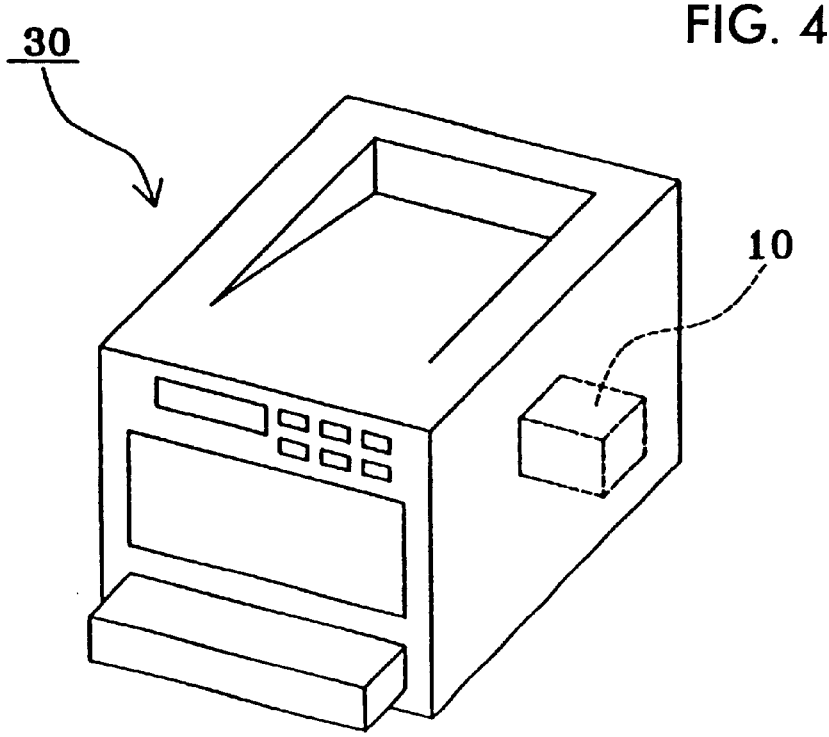
FIG. 4 is a perspective view of an electronic apparatus according to an embodiment of the present invention.

FIG. 4 is a perspective view of an electronic apparatus according to an embodiment of the present invention. In FIG. 4, a printer 30 serving as an electronic apparatus uses the multi-output DC-DC converter 10 according to the present invention as a power-supply circuit. A first output is used as a power supply for a relatively-heavy-load circuit which, for example, operates only during printing, and a second output is used as a power supply for a relatively-light-load circuit which always operates.

Since the printer 30 uses the multi-output DC-DC converter 10 according to the present invention, a stable voltage is applied to each circuit during printing and during waiting for printing to implement a stable operation.

The printer 30 shown in FIG. 4 uses the multi-output DC-DC converter 10 shown in FIG. 1. The printer 30 may use the multi-output DC-DC converter 20 shown in FIG. 3. In this case, the same advantages are obtained.

Electronic apparatus according to the present invention are not limited to printers but include all electronic apparatus which require a multi-output DC-DC converter for a first output connected to a load which largely varies and for a second output, such as notebook personal computers and mobile information units.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A multi-output DC-DC converter comprising a step-down DC-DC converter circuit comprising:
   a switching device for switching an input DC voltage to convert it to a pulse voltage;
   a choke coil and a smoothing capacitor for smoothing the pulse voltage to obtain a first output lower than the input DC voltage; and
   a flywheel rectifying device for causing a current to flow through the choke coil when the switching device is off; and
   a rectifying circuit for processing and rectifying the pulse voltage of the DC-DC converter circuit to obtain a second output,
   wherein the flywheel rectifying device is a bi-directional synchronous rectifying device which is turned on when the switching device is off.

2. The multi-output DC-DC converter according to claim 1, wherein the choke coil is a transformer of which a secondary winding is connected to the rectifying circuit.

3. The multi-output DC-DC converter according to claim 1, wherein the rectifying circuit comprises a coupling capacitor and a diode.

4. The multi-output DC-DC converter according to claim 2, wherein the rectifying circuit comprises a coupling capacitor and a diode.

5. The multi-output DC-DC converter according to claim 1, wherein the flywheel rectifying device comprises a switching transistor.

6. The multi-output DC-DC converter according to claim 5, further comprising a diode in parallel to the flywheel rectifying device to ensure that current flows through the choke coil when the switching device and flywheel rectifying device are off.

7. The multi-output DC-DC converter according to claim 5 wherein the switching transistor comprises a MOS FET.

8. An electronic apparatus having a multi-output DC-DC converter, the DC-DC converter comprising a step-down DC-DC converter circuit comprising:
   a switching device for switching an input DC voltage to convert it to a pulse voltage;
   a choke coil and a smoothing capacitor for smoothing the pulse voltage to obtain a first output lower than the input DC voltage; and
   a flywheel rectifying device for causing a current to flow through the choke coil when the switching device is off; and
   a rectifying circuit for processing and rectifying the pulse voltage of the DC-DC converter circuit to obtain a second output,
   wherein the flywheel rectifying device is a bi-directional synchronous rectifying device which is turned on when the switching device is off.

9. The electronic apparatus according to claim 8, wherein the choke coil is a transformer of which a secondary winding is connected to the rectifying circuit.

10. The electronic apparatus according to claim 8, wherein the rectifying circuit comprises a coupling capacitor and a diode.

11. The electronic apparatus according to claim 9, wherein the rectifying circuit comprises a coupling capacitor and a diode.

12. The electronic apparatus according to claim 8, wherein the flywheel rectifying device comprises a switching transistor.

13. The electronic apparatus according to claim 12, further comprising a diode in parallel to the flywheel rectifying device to ensure that current flows through the choke coil when the switching device and flywheel rectifying device are off.

14. The electronic apparatus according to claim 12, wherein the switching transistor comprises a MOS FET.

* * * * *